United States Patent [19]
Hallerstrom et al.

[11] Patent Number: 5,183,299
[45] Date of Patent: Feb. 2, 1993

[54] INSULATED PIPE WITH END PROTECTION

[76] Inventors: Robert Hallerstrom, Rte. 1, Box 139, Osage, Minn. 56570; Kirby Durgin, Rte. 3, Box 444, Nevis, Minn. 56467; Wesley Benjamin, Rte. 4, Park Rapids, Minn. 56470

[21] Appl. No.: 781,877

[22] Filed: Oct. 24, 1991

[51] Int. Cl.⁵ ............................................. F16L 59/00
[52] U.S. Cl. ...................................... 285/47; 285/45; 138/96 R; 138/149
[58] Field of Search ...................... 285/45, 46, 47, 423, 285/399; 138/96 R, 149

[56] References Cited

U.S. PATENT DOCUMENTS

| | | | |
|---|---|---|---|
| 2,370,193 | 2/1945 | Reid | 285/423 |
| 2,401,974 | 6/1946 | Siebels | 138/76 |
| 2,907,351 | 10/1959 | Rohrback et al. | 285/45 |
| 3,352,574 | 11/1967 | Brian | 285/45 |
| 3,552,445 | 1/1971 | Andrews | 138/144 |
| 3,677,303 | 7/1972 | Martin | 138/109 |
| 3,885,595 | 5/1975 | Gibson et al. | 138/250 |
| 3,902,336 | 9/1975 | Siegmund | 285/45 |
| 3,941,159 | 3/1976 | Toll | 138/147 |
| 3,949,461 | 4/1976 | Thastrup | 29/460 |
| 4,025,091 | 5/1977 | Zeile, Jr. | 285/53 |
| 4,221,239 | 9/1980 | Reale | 138/149 |
| 4,271,218 | 6/1981 | Heckel et al. | 428/36 |
| 4,307,756 | 12/1981 | Voigt et al. | 138/149 |
| 4,465,307 | 8/1984 | de Lange | 285/47 |
| 4,538,834 | 9/1985 | Brady et al. | 285/10 |
| 4,570,680 | 2/1986 | Ratti | 138/149 |
| 4,590,971 | 5/1986 | Webster et al. | 138/149 |
| 4,605,043 | 8/1986 | Grenier | 138/149 |
| 4,637,637 | 1/1987 | Adorjan | 285/47 |
| 4,700,751 | 10/1987 | Fedrick | 138/149 |
| 4,713,271 | 12/1987 | Searl et al. | 428/36 |
| 4,773,448 | 9/1988 | Francis | 138/28 |
| 4,979,679 | 12/1990 | Downs | 239/548 |
| 5,002,716 | 3/1991 | Van Dijck | 264/230 |

FOREIGN PATENT DOCUMENTS

| | | | |
|---|---|---|---|
| 889203 | 12/1971 | Canada | 285/47 |
| 2137699 | 2/1973 | Fed. Rep. of Germany | 285/47 |
| 1402273 | 5/1965 | France | 285/45 |
| 1155009 | 6/1969 | United Kingdom | 285/45 |

Primary Examiner—Eric K. Nicholson
Attorney, Agent, or Firm—Jacobson and Johnson

[57] ABSTRACT

A conduit and method of making a conduit for an underground conduit system, where the conduits are protected from ultra-violet rays, the conduit system being able to transport and insulate a variety of materials including, but not limited to, fluids and wires. The assembled conduits being able to be located underground to support the weight of the soil without crushing the insulating layer and thus destroying the insulating qualities of the insulating layer. The assembled conduits coact to protect the interior of the conduit system from moisture located radially outward of the conduit system. The conduits have an interior rigid pipe which is used to carry fluids and wires and the like, surrounding the interior rigid pipe is an annular insulating layer which acts as an insulator to prevent fluids from freezing in the pipe by retaining the heat of the fluid in the pipe and, a waterproof seal mechanism to form the annular insulating layers of adjacent conduits into a leakproof engagement with a flexible cylindrical sleeve surrounding the annular insulating layer with the flexible cylindrical sleeve extending beyond the ends of the insulating layer to form a protective covering to keep the ends of the conduits free of contaminates when the conduit is being stored.

9 Claims, 2 Drawing Sheets

INSULATED PIPE WITH END PROTECTION

FIELD OF THE INVENTION

This invention relates to the field of conduits, and more specifically, of conduit systems which are waterproof, can resist crushing forces, can allow transport of fluids or act as housing for wires, can be fit together with ease and can provide protection for the ends of the conduits during storage.

BACKGROUND OF THE INVENTION

Conduit systems for fluids and electrical wires have existed for quite some time. These systems were designed to do a variety of tasks. Some carry liquids and keep them at constant temperatures, some carry gasses and are designed especially to avoid change in enthalpy, some are designed to protect the contents from harmful outside environments, and some are designed to carry harmful fluids without damaging the outside environment. Many conduit systems consist of a number of pieces, and these pieces must be put together end to end. One of the problems with the prior art is that the ends of these pieces often become frayed and worn while in storage, and when the pieces are put together they often require other assemblies or outside equipment. Often times these pieces are heavy and bulky, creating problems and preventing freedom of movement, and the pieces that are lightweight often cannot be buried deep or they will collapse under the weight of the earth.

An object of this invention is to provide a conduit system which is lightweight, yet strong enough to withhold the crushing strength of the earth.

Another object of this invention is to provide a conduit system which has ends that fold inward to allow for protection of the conduit ends during storage.

Another object of this invention is to provide a conduit system that requires no external machinery or extra parts to assemble.

Another object of this invention is to provide a waterproof conduit system which can allow for the transportation of fluid or use as an underground housing for electrical wires.

DESCRIPTION OF THE PRIOR ART

U.S. Pat. No. 4,979,679 is a zinc-coated plastic conduit system which protects the system from U.V. radiation.

U.S. Pat. No. 5,002,716 is a series of joining thermally insulated conduit pieces.

U.S. Pat. No. 4,025,091 is a conduit system which includes a pipe, a pipe insulating body, a conduit jacket, and sealing members, and also has a separate set of parts to allow pieces of the conduit system to fit together.

U.S. Pat. No. 3,949,461 is a method patent describing a coupling system for a conduit system.

U.S. Pat. No. 4,221,239 is an insulated conduit system with an annular groove and tongue coupling system.

U.S. Pat. No. 4,271,218 is a pipe insulating jacket which fits around the outside of a conduit system.

U.S. Pat. No. 4,307,756 is a thermally insulated conduit system with a flame resistant outer coating and a spacer coiled around the copper tube.

U.S. Pat. No. 4,465,307 is a pipe coupler for insulated pipes containing a system which includes a pressure equalizing system, and a system which allows for one or more ribs or T-branches from initial piping.

U.S. Pat. No. 4,538,834 is a tubular series for transferring fluids in which the ends of the pipes have frusto conically shaped contoured ends.

U.S. Pat. No. 4,570,680 is a thermally insulated conduit piece which is used for conducting chemically aggressive fluids and includes a protective layer mad of the metal lead (Pb).

U.S. Pat. No. 4,590,971 is an insulated pipeline comprising sections of a heat-insulating material held together by an external corrosion resisting coated pipe.

U.S. Pat. No. 4,605,043 is a snap-on heat insulating jacket for ducts including a sealant that must be applied.

U.S. Pat. No. 4,637,637 is a pipeline system which allows for an extreme range of temperatures, including an interior insulating vapor barrier.

U.S. Pat. No. 4,700,751 is an insulated pipe system which includes inner insulation and an inner conduit but also requires external equipment to connect the tubing.

U.S. Pat. No. 4,773,448 is a freeze resistant plastic pipeline designed for fluids and its method of manufacture.

U.S. Pat. No. 4,713,271 is a foamed tubing system containing up to 50% of an elastomer.

U.S. Pat. No. 3,941,159 is an insulation system for a tubular conduit system including an annular insulator and a piece of fabric which wraps around the insulator.

U.S. Pat. No. 3,677,303 is a prefabricated conduit system which has a coupling system containing O-rings.

U.S. Pat. No. 3,885,595 is a conduit system for transporting cryogenic fluid which has a system for compensating size differences in the conduit system due to temperature differences.

U.S. Pat. No. 3,552,445 is an insulated pipe system with a polyethylene layer.

U.S. Pat. No. 2,401,974 is an insulated air conditioning duct.

BRIEF SUMMARY OF THE INVENTION

This invention comprises a conduit and its method of manufacture. The conduit has an interior rigid plastic pipe which is used to carry fluids or act as a housing for wires and the like. Surrounding the interior rigid pipe is an annular insulating layer which acts as an insulator to prevent fluids from freezing in the pipe by retaining the heat of the fluid in the pipe. The conduit includes waterproof seal mechanisms to form the annular insulating layers of adjacent conduits into a leakproof engagement with each other. The conduit includes a flexible cylindrical sleeve surrounding the annular insulating layer with the flexible cylindrical sleeve extending beyond the ends of the annular insulating layer to form a protective covering to keep the ends of the conduits free of contaminates when the conduit is being stored. When the conduits are connected in an end to end relationship the ends of the flexible cylindrical sleeve can be folded over an adjacent end of a second conduit to thereby act as part of a coupling mechanism for coupling conduits to each other to form conduit system comprised of individual insulated conduits with a lap joint formed by the flexible cylindrical sleeve located on adjacent conduits.

DESCRIPTION OF THE PREFERRED EMBODIMENT

Figure 1:
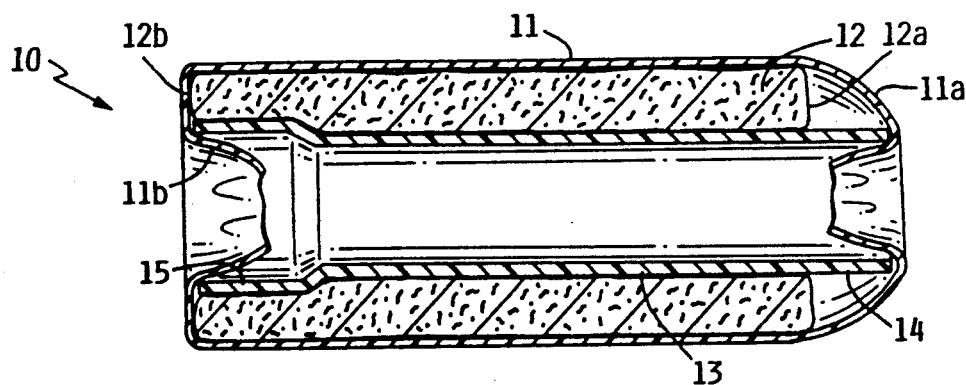
FIG. 1 is a cross sectional view of the U.V. resistant multi-purpose conduit.

FIG. 1 is a cross sectional view of a U.V. (ultra-violet) resistant multi-purpose conduit 10 which is comprised of a rigid plastic pipe 13 surrounded by an annular insulating layer 12 made of polyurethane foam or the like and a cylindrical flexible sleeve 11 made of polyethylene or the like which blocks ultra-violet rays from contacting insulating layer 12. The U.V. resistant cylindrical flexible sleeve 11 has a first end 11a which folds into male end of plastic pipe 13 and a second end 11b that folds into the female end of plastic pipe 13 to keep the male and female ends of the plastic pipe that are to be joined free and clear of dirt and contaminants during the storing and handling of the conduits. Typically, male end 14 fits snugly inside of a female end of an identical plastic pipe to enable the user to build a continuous insulated pipeline on site with the use of our multi-purpose conduits 10.

Generally, the invention comprises a conduit 10 with means for securing the end of one identical conduit to the end of another identical conduit to enable a user to construct a continuous insulated pipe using only a plurality of conduits and an adhesive. Each of the conduits comprises a rigid pipe 13 having an interior region and an exterior surface with the rigid pipe having a male end 14 and a female end 15 so that the male end of one rigid pipe can be mated with a female end of another rigid pipe. Located outside of the rigid pipe, which preferably is a plastic such as polyvinylchloride, is an annular insulating layer 12 which is located around the exterior surface of rigid plastic pipe 13. The annular insulating layer 12 has a first end 12a and a second end 12b with the first end of annular insulating layer 12 having a shape to conform to the end shape of another annular insulating layer so that when two annular insulating layers are abutted together they mate sufficiently close with each other so that they can be adhesively secured to each other. A further characteristic of the annular insulating layer 12 is that it has sufficient crush strength so as to retain its annular shape when buried underground thereby preventing the conduit from losing its effectiveness as an insulating layer. Located around the annular insulating layer 12 is a flexible cylindrical sleeve 11 that extends completely around annular insulating layer 12. In the preferred embodiment flexible cylindrical sleeve 11 is frictionally held around annular insulating layer 12 with both ends of the flexible cylindrical sleeve 11 projecting beyond the ends of the annular insulating layer 12 sufficiently far so that the ends 11a and 11b of flexible cylindrical sleeve 11 can be tucked around and into the open ends of rigid plastic pipe 13 to keep the ends of the rigid plastic pipe 13 free of debris and contaminants until conduit 10 is ready to assemble to another conduit. During assembly the ends 11a and 11b of the flexible cylindrical sleeve 11 that project beyond the ends of the annular insulating layer 12 can be overlapped with the free ends of each of the cylindrical sleeve extended from an adjacent conduit to form a double layer protective lap joint at the joint region between two adjacent conduits that are fastened in an end to end relationship.

Figure 4:
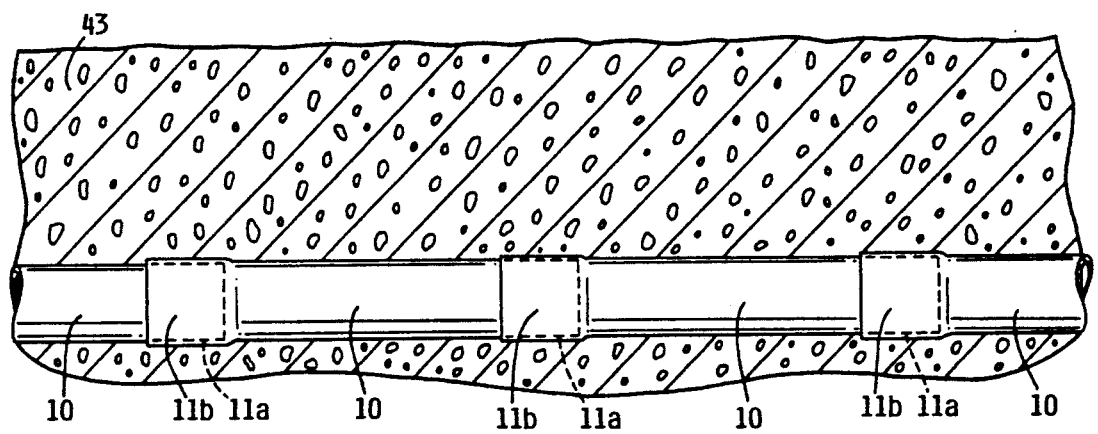
FIG. 4 is a pictorial view of a series of U.V. resistant multi-purpose conduit units attached end to end.

FIG. 4 shows a plurality of conduits joined together and located below ground. The annular insulating layer 12 is made of polyurethane foam which has a sufficiently high crush strength so as not to collapse when the conduit system is buried under the soil, thereby allowing annular insulating layer 12 to be put under a great pressure without reducing the thermal effectiveness of the insulating layer. Annular insulating layer 12 also forms a waterproof seal around the rigid pipe 13 which prevents water from entering the U.V. resistant multi-purpose conduit system 10 and rendering it ineffective.

Figure 2:
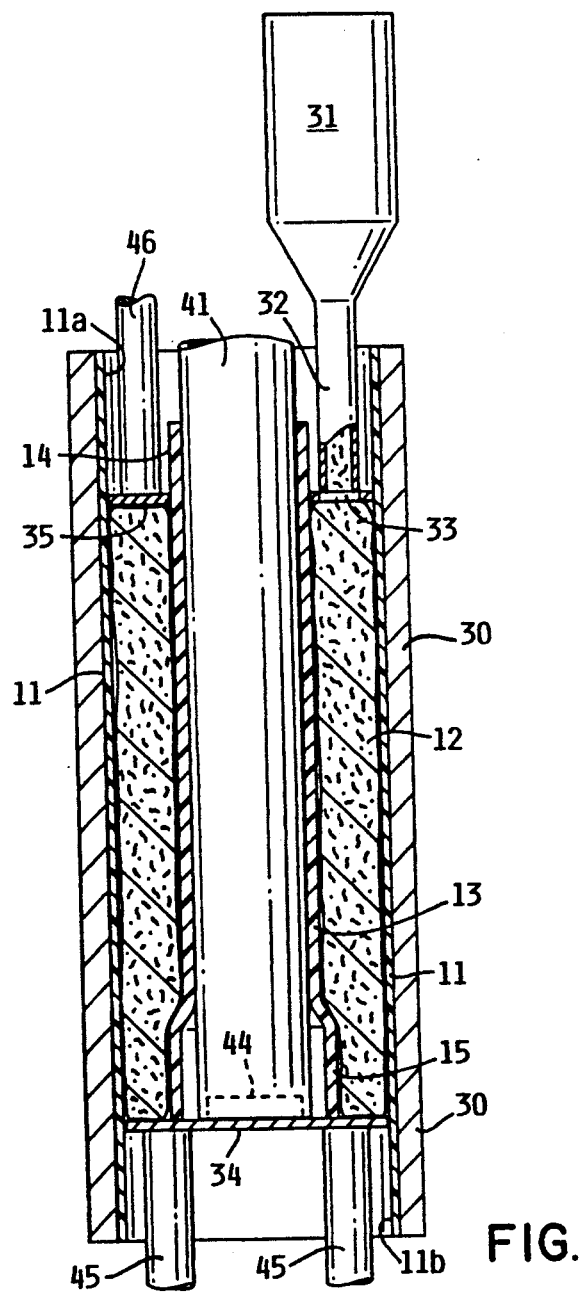
FIG. 2 is a cross sectional view of the molding apparatus for forming an individual conduit.

FIG. 2 is an illustration of the method used to form a U.V. resistant multi-purpose conduit 10. In the process of making the conduit a cylindrical flexible sleeve 11, which is made from a material such as polyethylene, is placed inside of a cylindrical mold 30. A metal core support 41 is placed inside mold 30 and rests on top of an end mold plate 34 supported by members 45. Metal core support 41 also fits snugly around a cylindrical extension 44 extending up from plate 34 to prevent lateral movement of metal core support 41 during the process of molding the U.V. resistant multi-purpose conduit 10. Next, plastic pipe 13 is placed over metal core support 41 so that the metal core support 13 acts as a centering guide and as a radial support to prevent plastic pipe 13 from being forced out of round during the molding process. Plastic pipe 13 rests on end mold 34 thereby forming an annular compartment between mold 13 and plastic pipe 13 for which insulating material is injected. Located on the other end of mold is an end plate 35 and mold support member 46 to hold end plate 35 in position. Located above mold 13 is a hopper 31 having a nozzle 32 that extends into the annular chamber between cylindrical flexible sleeve 11 and rigid pipe 13. Heated and under pressure, polyurethane is forced through nozzle end 33 and fills the annular chamber between cylindrical flexible polyethylene sleeve 11 and plastic pipe 13. Notice that end 11a and end 11b of cylindrical flexible sleeve 11 have not been covered by annular insulating layer 12, which allows end 11a and end 11b to extend beyond the molded end of the annular insulating layer 12 and to eventually be folded around plastic pipe 13 for protection of the ends of both pipe 13 and insulating layer 12.

The process of forming conduit 10 through the pressure injection of a flowable material into annular chamber defined by a rigid plastic pipe 13 and a flexible outer covering creates a composite conduit wherein the three components namely, the plastic pipe 13, the annular insulating layer 12 and cylindrical flexible polyethylene sleeve 11 are held together as a unit by the radial inward pressure of the annular insulating layer 12 against the rigid pipe 13 and the radial outward pressure of the insulating layer 12 against the cylindrical flexible sleeve 11. That is the frictional forces between annular insulating layer 12 and cylindrical flexible sleeve 11 are sufficient to prevent cylindrical flexible sleeve 11 from slipping off of annular insulating layer 12 during handling and use of conduit 10. The use of frictional forces to hold the conduit together eliminates the need for adhesives to secure the components of conduit 10 to each other thereby making an inexpensive and lightweight conduit for ease in handling and assembly.

Male end 14 of plastic pipe 13 extends beyond the end of annular insulating layer 12 so male end 14 can be fitted inside the female end of another identical plastic pipe 13. After annular insulating layer 12 has solidified, end mold 45 and 35 are removed as well as, metal core support 41, and hopper 31 thus producing a unitary U.V. resistant multi-purpose conduit unit comprised of an inner plastic pipe 13, an annular insulating layer 12 and an outer cylindrical flexible sleeve 11 held together only by the forces between materiels with cylindrical flexible sleeve 11 having free ends for protecting the ends of conduit 10 during storage and handling and for lapping to an adjacent and identical conduit 10 to produce a lapped joint at the junction between two adjacent conduits.

Figure 3:
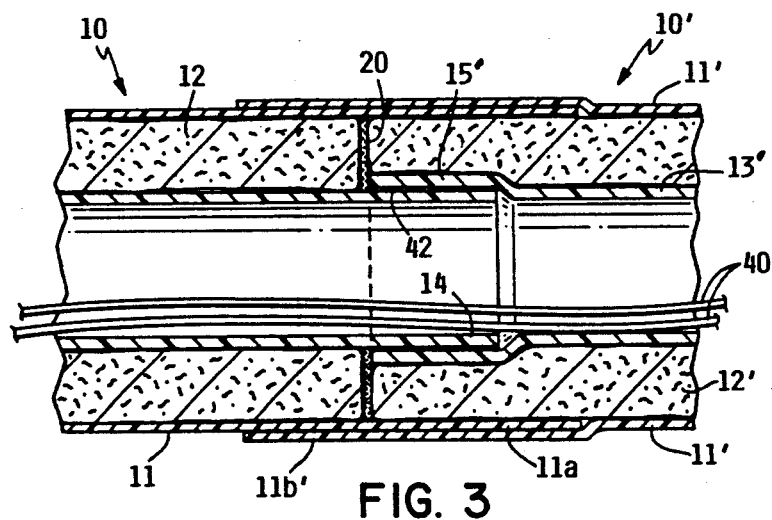
FIG. 3 is a side sectional view of two of U.V. resistant multi-purpose conduits attached end to end.

FIG. 3 shows U.V. resistant multi-purpose conduit 10 joined with another U.V. resistant multi-purpose conduit 10'. To illustrate one use of the invention a set of wires 40 run inside of plastic pipe 13, however, in other applications pipe 13 can be used for carrying fluids that may freeze if not insulated from the outside environment. To provide a leakproof joint between adjacent pipes within the conduits 10 and 10' male end 14 of pipe 12 is frictionally and adhesively held inside female end 15' of pipe 13 by a sealant 42. If desired the annular insulating layer 12 of flexible polyethylene film 11 can be fastened to the annular insulating layer 12' by an adhesive 42 to thereby provide an outer waterproof seal between the ends of conduits 10 and 10'. Note, end 11a of cylindrical flexible sleeve 11 fits snugly inside of end 11b' of another identical section of cylindrical flexible sleeve 11'. That is, cylindrical flexible sleeve 11 has sufficient stretchability so that a user can abut conduits 10 and 10' in an end to end relationship and then roll back cylindrical flexible sleeve 11b' and roll cylindrical flexible sleeve 11a onto the end of adjacent conduit 12'. Next, the user rolls cylindrical flexible sleeve 11b over the cylindrical flexible sleeve 11a to create an overlapping joint at the junction of the two ends of insulating layers 12 and 12'. If desired an adhesive can be placed between end 11b' and end 11a to secure end 11a and end 11b' in a sealed and waterproof relationship to each other.

FIG. 4 shows a series of U.V. resistant multi-purpose conduits 10 units connected together and buried under a layer of earth 43.

Figure 5:
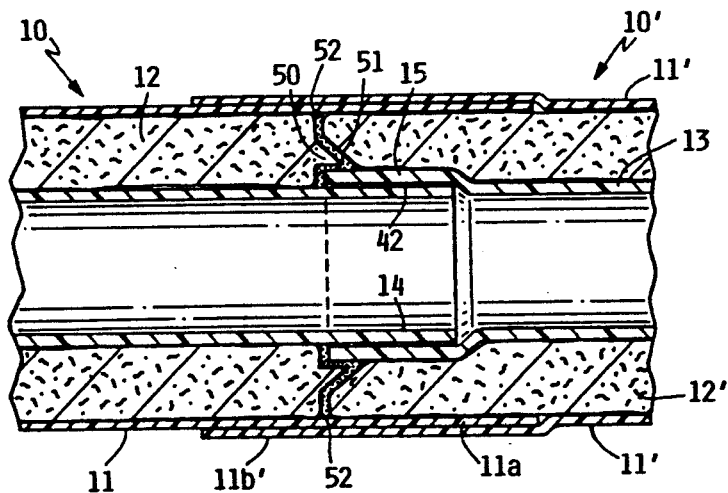
FIG. 5 is a cross sectional view of an alternate embodiment of a conduit of our invention.

FIG. 5 illustrates an alternate embodiment of the invention with the conduits having different end shapes. The portions of conduit 10 and 10' that are identical to those portions shown in FIG. 3 have the same numerals. The conduit 10' shown in FIG. 5 has one one end of insulating layer 12 having a frusto conical or tapered male member 50 that mates with a frusto conical or tapered recess 51 located on the opposite end of an adjacent insulating layer. A layer of adhesive 52 extends between the end surfaces of the members 10 and 10' to hold the members in and end to end relationship. In the embodiment of FIG. 5 the end of conduit 10 includes two surfaces that are located at oblique angles to each other so as to provide a non linear path between the two conduits. In addition the use of an angled surface permits a greater area for adhesives as well as permits securing the insulating layers of the ends of conduits to each other in a more secure locking engagement then an end to end relationship.

We claim:

1. A conduit for securing to another conduit to enable a user to construct a continuous insulated pipe using a plurality of conduits comprising:

a rigid pipe having an interior region and an exterior surface, said rigid pipe having a male end and a female end so that said male end of said rigid pipe can be mated with a female end of another rigid pipe;

an annular insulating layer located around the exterior surface of said rigid pipe, said annular insulating layer having a first end and a second end, said first end having a shape to conform to another annular insulating layer so that when two annular insulating layers are abutted together they can be adhesively secured to each other, said annular insulating layer having sufficient crush strength so as to retain its annular shape when buried underground; and a flexible cylindrical sleeve extending around said annular insulating layer, said flexible cylindrical sleeve frictionally held around said insulating layer, said flexible cylindrical sleeve having a first end and a second end, said first end of said flexible cylindrical sleeve projecting beyond the first end of said annular insulating layer so that said first end of said flexible cylindrical sleeve can be tucked around the first end of said annular insulating layer and into the female end of said rigid pipe to thereby keep the female end of said rigid pipe free of debris and contaminants until said rigid pipe is ready to assemble to another rigid pipe, said second end of said flexible cylindrical sleeve projecting beyond the second end of said annular insulating layer so that said second end of said flexible cylindrical sleeve can be tucked around the second end of said annular insulating layer and into the male end of said rigid pipe to thereby keep the male end of said rigid pipe free of debris and contaminants until said rigid pipe conduit is ready to assemble to another rigid pipe.

2. The conduit of claim 1 including:

a second rigid pipe having a first end and a second end;

a second annular insulating layer having a first end and a second end;

a second flexible cylindrical sleeve, said second flexible cylindrical sleeve having a first end and a second end said second end of said second flexible cylindrical sleeve projecting beyond the second end of said second annular insulating layer so that when said first rigid pipe is connected to said second rigid pipe the second end of said second flexible cylindrical sleeve extends onto the first end of said first annular insulating layer and the first end of said first flexible cylindrical sleeve extends unto the second end of said second annular insulating layer to thereby create an overlapping region between said second end of said second flexible cylindrical sleeve and said first end of said first flexible cylindrical sleeve.

3. The conduit of claim 1 wherein said insulating layer comprises polyurethane, said flexible cylindrical sleeve comprises polyethylene and said rigid pipe comprises a rigid plastic pipe.

4. The conduit of claim 1 wherein said rigid pipe comprises polyvinylchloride.

5. The conduit of claim 1 wherein said said first end having a shape to conform to another annular insulating layer so that when two annular insulating layers are abutted together they can be adhesively secured to each other comprises a tapered lip that projects outward from said first end having a shape to conform to another annular insulating layer.

6. The conduit of claim 1 wherein said the sole means for holding said annular insulating layer, said rigid pipe and said flexible cylindrical sleeve together as a unit comprises frictional forces between the rigid pipe and the annular insulating layer and frictional forces between the annular insulating layer and the flexible cylindrical sleeve.

7. The conduit of claim 1 wherein said said first end having a shape to conform to another annular insulating layer so that when two annular insulating layers are abutted together they can be adhesively secured to each other comprises a squared off end so that said first end having a shape to conform to the second end of the annular insulating layer can be adhesively fastened thereto.

8. The conduit of claim 1 wherein the ends of said flexible cylindrical sleeve extend a minimum of 8 inches beyond the ends of said conduit.

9. The conduit of claim 1 wherein the flexible cylindrical sleeve comprises a ultra-violet blocker material to inhibit degradation of the annular insulating layer.

* * * * *